US 11,821,066 B2

(12) United States Patent
Pralong et al.

(10) Patent No.: US 11,821,066 B2
(45) Date of Patent: Nov. 21, 2023

(54) SYSTEMS AND METHODS FOR NON-CONTACT TENSIONING OF A METAL STRIP

(71) Applicant: NOVELIS INC., Atlanta, GA (US)

(72) Inventors: Antoine Jean Willy Pralong, Sierre (CH); David Anthony Gaensbauer, Kennesaw, GA (US); Rodger Brown, Atlanta, GA (US); William Beck, Bowling Green, KY (US); Andrew James Hobbis, Bath (CA)

(73) Assignee: Novelis Inc., Atlanta, GA (US)

( * ) Notice: Subject to any disclaimer, the term of this patent is extended or adjusted under 35 U.S.C. 154(b) by 5 days.

(21) Appl. No.: 17/352,511

(22) Filed: Jun. 21, 2021

(65) Prior Publication Data
US 2021/0310107 A1 Oct. 7, 2021

Related U.S. Application Data

(62) Division of application No. 15/716,559, filed on Sep. 27, 2017, now Pat. No. 11,072,843.
(Continued)

(51) Int. Cl.
B21C 47/34 (2006.01)
B21C 47/16 (2006.01)
(Continued)

(52) U.S. Cl.
CPC ............ C22F 1/04 (2013.01); B21B 39/02 (2013.01); B21B 39/34 (2013.01); B21C 47/16 (2013.01);
(Continued)

(58) Field of Classification Search
None
See application file for complete search history.

(56) References Cited

U.S. PATENT DOCUMENTS 1,776,775 A 9/1930 Biggert, Jr.
1,872,045 A 8/1932 Smitmans
(Continued)

FOREIGN PATENT DOCUMENTS

CN 1190361 8/1998
CN 1389879 1/2003
(Continued)

OTHER PUBLICATIONS

Machine translation of JPH07-328719A. (Year: 1995).*
(Continued)

Primary Examiner — Xiaowei Su
(74) Attorney, Agent, or Firm — Kilpatrick Townsend & Stockton LLP

(57) ABSTRACT

Systems and methods of non-contact tensioning of a metal strip during metal processing include passing the metal strip adjacent a magnetic rotor. The magnetic rotor is spaced apart from the metal strip by a first distance. The systems and methods also include tensioning the metal strip through the magnetic rotor by rotating the magnetic rotor. Rotating the magnetic rotor induces a magnetic field into the metal strip such that the metal strip is tensioned in an upstream direction or a downstream direction. In other aspects, rotating the magnetic rotor induces a magnetic field into the metal strip such that a force normal to a surface of the metal strip is applied to the metal strip.

2 Claims, 8 Drawing Sheets

Related U.S. Application Data

(60) Provisional application No. 62/505,948, filed on May 14, 2017, provisional application No. 62/400,426, filed on Sep. 27, 2016.

(51) Int. Cl.

| | | |
|---|---|---|
| *C22F 1/04* | (2006.01) | |
| *B21C 47/18* | (2006.01) | |
| *H05B 6/10* | (2006.01) | |
| *B65H 29/00* | (2006.01) | |
| *B65H 29/20* | (2006.01) | |
| *B21D 22/02* | (2006.01) | |
| *B21D 37/16* | (2006.01) | |
| *C21D 1/42* | (2006.01) | |
| *F27D 99/00* | (2010.01) | |
| *H05B 6/32* | (2006.01) | |
| *H05B 6/36* | (2006.01) | |
| *B21B 39/02* | (2006.01) | |
| *B21B 39/34* | (2006.01) | |
| *B21C 37/02* | (2006.01) | |
| *C21D 1/04* | (2006.01) | |
| *C22C 21/02* | (2006.01) | |
| *C22C 21/06* | (2006.01) | |
| *C22C 21/10* | (2006.01) | |
| *C22C 21/12* | (2006.01) | |
| *B65G 54/02* | (2006.01) | |
| *C22F 1/02* | (2006.01) | |
| *H02N 15/00* | (2006.01) | |
| *F27D 19/00* | (2006.01) | |

(52) U.S. Cl.
CPC .......... *B21C 47/18* (2013.01); *B21C 47/3433* (2013.01); *B21C 47/3483* (2013.01); *B21D 22/022* (2013.01); *B21D 37/16* (2013.01); *B65H 29/006* (2013.01); *B65H 29/20* (2013.01); *C21D 1/42* (2013.01); *F27D 99/0001* (2013.01); *H05B 6/104* (2013.01); *H05B 6/32* (2013.01); *H05B 6/36* (2013.01); *B21C 37/02* (2013.01); *B65G 54/02* (2013.01); *C21D 1/04* (2013.01); *C22C 21/02* (2013.01); *C22C 21/06* (2013.01); *C22C 21/10* (2013.01); *C22C 21/12* (2013.01); *C22F 1/02* (2013.01); *F27D 2019/0003* (2013.01); *H02N 15/00* (2013.01); *Y02P 10/25* (2015.11)

(56) References Cited

U.S. PATENT DOCUMENTS

| | | |
|---|---|---|
| 2,001,637 A | 5/1935 | Talbot |
| 2,041,235 A | 5/1936 | Darbaker |
| 2,058,447 A | 10/1936 | Hazelett |
| 2,058,448 A | 10/1936 | Hazelett |
| 2,092,480 A | 9/1937 | Talbot |
| RE21,260 E | 11/1939 | Hazelett |
| 2,334,109 A | 11/1943 | McBain et al. |
| 2,448,009 A | 8/1948 | Baker |
| 2,448,012 A | 8/1948 | Baker |
| 2,481,172 A | 9/1949 | Staggs |
| 2,494,399 A | 1/1950 | McCleary |
| 2,527,237 A | 10/1950 | Wilcox, Jr. |
| 2,529,884 A | 11/1950 | Reynolds |
| 2,566,274 A | 8/1951 | White et al. |
| 2,722,589 A | 11/1955 | Marquardt |
| 2,731,212 A | 1/1956 | Baker |
| 2,753,474 A | 7/1956 | Walworth et al. |
| 2,769,932 A | 11/1956 | Zozulin et al. |
| 2,895,034 A | 7/1959 | Baffrey et al. |
| 2,912,552 A | 11/1959 | Baermann |
| 3,008,026 A | 11/1961 | Kennedy |
| 3,072,309 A | 1/1963 | Hill |
| 3,184,938 A | 5/1965 | Terwilliger |
| 3,218,001 A | 11/1965 | Gombos |
| 3,272,956 A | 9/1966 | Baermann |
| 3,344,645 A | 10/1967 | Dario |
| 3,376,120 A | 4/1968 | Hiegel |
| 3,422,649 A | 1/1969 | Lowy |
| 3,431,971 A | 3/1969 | Gyongyos |
| 3,438,231 A | 4/1969 | Petzschke |
| 3,444,346 A | 5/1969 | Russell et al. |
| 3,453,847 A | 7/1969 | Romanauskas |
| 3,535,902 A | 10/1970 | Sevenich et al. |
| 3,562,470 A | 2/1971 | Bobart et al. |
| 3,604,696 A | 9/1971 | Coleman et al. |
| 3,606,778 A | 9/1971 | Bomberger |
| 3,635,417 A | 1/1972 | Kajiwara et al. |
| 3,746,229 A | 7/1973 | Feller et al. |
| 3,793,867 A | 2/1974 | Safford |
| 3,837,391 A | 9/1974 | Rossi |
| 3,879,814 A | 4/1975 | Mojelski |
| 4,019,359 A | 4/1977 | Smith |
| 4,054,770 A | 10/1977 | Jackson et al. |
| 4,138,074 A | 2/1979 | Ross et al. |
| 4,185,183 A | 1/1980 | Kamimoto |
| 4,214,467 A | 7/1980 | Sankaran |
| 4,291,562 A | 9/1981 | Orr |
| 4,296,919 A | 10/1981 | Sakurai et al. |
| 4,321,444 A | 3/1982 | Davies |
| 4,379,396 A | 4/1983 | Hope et al. |
| 4,448,614 A | 5/1984 | Morimoto et al. |
| 4,485,651 A | 12/1984 | Tippins et al. |
| 4,520,645 A | 6/1985 | Ross et al. |
| 4,708,325 A | 11/1987 | Georges |
| 4,730,781 A | 3/1988 | Richter et al. |
| 4,743,196 A | 5/1988 | Imose et al. |
| 4,761,527 A | 8/1988 | Mohr |
| 4,795,872 A | 1/1989 | Hagisawa et al. |
| 4,828,227 A | 5/1989 | Georges et al. |
| 4,891,484 A | 1/1990 | Waggott et al. |
| 4,923,396 A | 5/1990 | Harada et al. |
| 5,356,495 A | 10/1994 | Wyatt-Mair et al. |
| 5,397,877 A | 3/1995 | Couffet et al. |
| 5,401,941 A | 3/1995 | Mauve et al. |
| 5,701,775 A | 12/1997 | Sivilotti et al. |
| 5,727,412 A | 3/1998 | Tippins et al. |
| 5,739,506 A | 4/1998 | Hanton et al. |
| 5,845,699 A | 12/1998 | Baharis |
| 5,911,781 A | 6/1999 | Vidt |
| 5,914,056 A | 6/1999 | Yamaguchi |
| 5,914,065 A | 6/1999 | Alavi |
| 6,011,245 A | 1/2000 | Bell |
| 6,019,200 A | 2/2000 | Janzen et al. |
| 6,129,136 A | 10/2000 | Tibbs et al. |
| 6,264,765 B1 | 7/2001 | Bryant et al. |
| 6,285,015 B1 | 9/2001 | Doizaki et al. |
| 6,327,883 B1 | 12/2001 | Noe et al. |
| 6,570,141 B2 | 5/2003 | Ross |
| 6,576,878 B2 | 6/2003 | Thorpe et al. |
| 6,776,857 B2 | 8/2004 | Lee |
| 7,257,977 B2 | 8/2007 | Arvedi |
| 7,525,073 B2 | 4/2009 | Lovens et al. |
| 7,671,307 B2 | 3/2010 | Nikanorov et al. |
| 7,726,383 B2 | 6/2010 | Pircher et al. |
| 7,786,693 B2 | 8/2010 | Schmitz et al. |
| 7,819,356 B2 | 10/2010 | Takatsuka et al. |
| 7,926,316 B2 | 4/2011 | Tachibana |
| 7,942,191 B2 | 5/2011 | Zhang et al. |
| 8,502,122 B2 | 8/2013 | Hirota |
| 8,592,735 B2 | 11/2013 | Hirota |
| 9,089,887 B2 | 7/2015 | Snyder et al. |
| 9,248,482 B2 | 2/2016 | Passoni et al. |
| 9,462,641 B2 | 10/2016 | Akers |
| 10,844,467 B2 * | 11/2020 | Gaensbauer .............. C22F 1/04 |
| 11,242,586 B2 | 2/2022 | Hobbis et al. |
| 11,479,837 B2 | 10/2022 | Custers |
| 11,499,213 B2 | 11/2022 | Hobbis et al. |
| 2006/0037989 A1 | 2/2006 | Zilkenat et al. |
| 2006/0070689 A1 | 4/2006 | Kropfl |
| 2006/0086726 A1 | 4/2006 | Yamamoto et al. |

(56) References Cited

U.S. PATENT DOCUMENTS

| | | |
|---|---|---|
| 2006/0123866 A1 | 6/2006 | Ho |
| 2007/0151635 A1 | 7/2007 | Sano et al. |
| 2007/0193322 A1 | 8/2007 | Beck et al. |
| 2009/0026303 A1 | 1/2009 | Schmitz et al. |
| 2009/0101636 A1 | 4/2009 | Lovens et al. |
| 2010/0050730 A1 | 3/2010 | Buschsieweke et al. |
| 2010/0237548 A1 | 9/2010 | Okada et al. |
| 2011/0091230 A1 | 4/2011 | Yamamoto |
| 2011/0095125 A1 | 4/2011 | Tazoe et al. |
| 2012/0037264 A1 | 2/2012 | Sakabe et al. |
| 2012/0074132 A1 | 3/2012 | Chen et al. |
| 2012/0305547 A1 | 12/2012 | Fukutani et al. |
| 2013/0139929 A1 | 6/2013 | Francoeur et al. |
| 2014/0147697 A1 | 5/2014 | Berkhout et al. |
| 2016/0016215 A1 | 1/2016 | Brown et al. |
| 2016/0363164 A1 | 12/2016 | Kosmicki et al. |
| 2018/0085803 A1 | 3/2018 | Hobbis et al. |
| 2018/0085805 A1 | 3/2018 | Pralong et al. |
| 2018/0085810 A1 | 3/2018 | Malpica et al. |
| 2018/0087122 A1 | 3/2018 | Custers |
| 2018/0087138 A1 | 3/2018 | Gaensbauer et al. |
| 2018/0092163 A1 | 3/2018 | Pralong et al. |
| 2018/0092164 A1 | 3/2018 | Gaensbauer et al. |

FOREIGN PATENT DOCUMENTS

| | | |
|---|---|---|
| CN | 1891363 | 1/2007 |
| CN | 101454466 | 6/2009 |
| CN | 101611316 | 12/2009 |
| CN | 100584986 | 1/2010 |
| CN | 101795785 | 8/2010 |
| CN | 101821031 | 9/2010 |
| CN | 201596682 | 10/2010 |
| CN | 102159745 | 8/2011 |
| CN | 102378427 | 3/2012 |
| CN | 102415210 | 4/2012 |
| CN | 102601115 | 7/2012 |
| CN | 102649129 | 8/2012 |
| CN | 102921727 | 2/2013 |
| CN | 104507190 | 4/2015 |
| CN | 104537253 | 4/2015 |
| CN | 104588430 | 5/2015 |
| CN | 105073291 | 11/2015 |
| CN | 105142813 | 12/2015 |
| CN | 105189791 | 12/2015 |
| CN | 105339101 | 2/2016 |
| DE | 857787 | 12/1952 |
| DE | 1163760 | 2/1964 |
| DE | 4213686 | 10/1993 |
| DE | 19650582 | 6/1998 |
| DE | 19524289 | 7/1999 |
| DE | 102006054383 | 5/2008 |
| DE | 102008061356 | 6/2010 |
| DE | 102006054383 | 10/2014 |
| EA | 012474 | 10/2009 |
| EP | 1221826 | 2/2006 |
| EP | 1604549 | 8/2006 |
| EP | 2112863 | 10/2009 |
| EP | 2157193 | 2/2010 |
| EP | 2233593 | 9/2010 |
| EP | 2434836 | 3/2012 |
| EP | 2478974 | 7/2012 |
| EP | 2233593 | 2/2013 |
| EP | 2800452 | 7/2016 |
| EP | 3520568 | 12/2020 |
| FR | 1347484 | 12/1963 |
| FR | 1387653 | 1/1965 |
| FR | 2780846 | 9/2000 |
| GB | 167545 | 8/1921 |
| GB | 600673 | 4/1948 |
| GB | 609718 | 10/1948 |
| GB | 988334 | 4/1965 |
| GB | 2114101 | 8/1983 |
| GB | 2121260 | 12/1983 |
| JP | S4934459 | 3/1974 |
| JP | S5168460 | 6/1976 |
| JP | S5469557 | 6/1979 |
| JP | S56102567 | 8/1981 |
| JP | S58127558 | 7/1983 |
| JP | S58193351 | 11/1983 |
| JP | S58221609 | 12/1983 |
| JP | 60257926 | 12/1985 |
| JP | S6486474 | 3/1989 |
| JP | 026008 | 1/1990 |
| JP | H02209457 | 8/1990 |
| JP | H0375344 | 3/1991 |
| JP | H0375345 | 3/1991 |
| JP | H04112485 | 4/1992 |
| JP | D0576932 | 3/1993 |
| JP | 0582248 | 4/1993 |
| JP | H0527041 | 4/1993 |
| JP | H0527042 | 4/1993 |
| JP | H0549117 | 6/1993 |
| JP | H05138305 | 6/1993 |
| JP | H05293605 | 11/1993 |
| JP | H0711402 | 1/1995 |
| JP | H07328719 | 12/1995 |
| JP | H09122752 | 5/1997 |
| JP | 11508526 | 7/1999 |
| JP | 2002529245 | 9/2002 |
| JP | 2011200889 | 10/2011 |
| JP | 2012152824 | 8/2012 |
| JP | 2016141843 | 8/2016 |
| KR | 20120116988 | 10/2012 |
| RU | 1784319 | 12/1992 |
| RU | 2333065 | 9/2008 |
| RU | 2353452 C2 | 4/2009 |
| RU | 97889 | 9/2010 |
| RU | 2504574 | 1/2014 |
| RU | 2539962 | 1/2015 |
| SU | 988404 A1 | 1/1983 |
| SU | 1005958 | 3/1983 |
| SU | 1316725 | 6/1987 |
| WO | 2007138152 | 12/2007 |
| WO | 2010091865 | 8/2010 |
| WO | 2012050552 | 4/2012 |
| WO | 2012084638 | 6/2012 |
| WO | 2015094482 | 6/2015 |
| WO | 2016035867 | 3/2016 |
| WO | 2016035893 | 3/2016 |
| WO | 2018064136 | 4/2018 |
| WO | 2018064138 | 4/2018 |
| WO | 2018064145 | 4/2018 |
| WO | 2018064218 | 4/2018 |
| WO | 2018064221 | 4/2018 |
| WO | 2018064224 | 4/2018 |
| WO | 2018064228 | 4/2018 |

OTHER PUBLICATIONS

U.S. Appl. No. 15/716,577, Final Office Action, dated Jan. 6, 2022, 20 pages.

U.S. Appl. No. 16/448,324, Final Office Action, dated Jan. 7, 2022, 9 pages.

U.S. Appl. No. 16/448,330, Final Office Action, dated Dec. 13, 2021, 9 pages.

Application No. CA3,037,755, Notice of Allowance, dated Nov. 30, 2021, 1 page.

Application No. CN202010092737.6, Office Action, dated Dec. 29, 2021, 23 pages.

Application No. JP2019-118054, Notice of Decision to Grant, dated Jan. 5, 2022, 3 pages.

Application No. JP2019-118055, Notice of Decision to Grant, dated Jan. 5, 2022, 3 pages.

Application No. JP2019-118059, Notice of Decision to Grant, dated Jan. 5, 2022, 3 pages.

Application No. CA 3,128,719, "Office Action", dated Nov. 2, 2022, 7 pages.

Brazilian Application No. BR112019005278-0, "Office Action", dated Jul. 19, 2022, 4 pages.

U.S. Appl. No. 15/716,577, Advisory Action, dated Mar. 15, 2022, 5 pages.

(56) References Cited

OTHER PUBLICATIONS

U.S. Appl. No. 16/448,324, Advisory Action, dated Mar. 14, 2022, 7 pages.
U.S. Appl. No. 16/448,330, Notice of Allowance, dated Mar. 3, 2022, 9 pages.
Application No. BR112018015294-3, Notice of Allowance, dated May 3, 2022.
Application No. BR112019005231-3, Notice of Allowance, dated May 3, 2022.
Application No. BR112019005273-9, Notice of Allowance, dated May 3, 2022.
Application No. CA3,037,750, Office Action, dated Mar. 11, 2022, 5 pages.
Application No. CA3,037,752, Notice of Allowance, dated May 25, 2022, 1 page.
Application No. CA3,038,298, Office Action, dated Jun. 3, 2022, 4 pages.
Application No. CN201780059427.0, Notice of Decision to Grant, dated May 18, 2022, 4 pages.
Application No. CN201780059427.0, Office Action, dated Feb. 18, 2022, 4 pages.
Application No. CN201780059464.1, Notice of Decision to Grant, dated Apr. 29, 2022, 4 pages.
Application No. CN202010092737.6, Notice of Decision to Grant, dated Mar. 2, 2022, 6 pages.
Canadian Application No. 3,128,719, "Office Action", dated Jul. 7, 2023, 10 pages.
"International Alloy Designations and Chemical Composition Limits for Wrought Aluminum and Wrought Aluminum Alloys", The Aluminum Association, Inc., Registration Record Series, Teal Sheets, Feb. 1, 2009, 35 pages.
U.S. Appl. No. 15/716,559, Advisory Action, dated Feb. 8, 2021, 4 pages.
U.S. Appl. No. 15/716,559, Final Office Action, dated Nov. 17, 2020, 10 pages.
U.S. Appl. No. 15/716,559, Non-Final Office Action, dated Jun. 23, 2020, 11 pages.
U.S. Appl. No. 15/716,559, Notice of Allowance, dated Apr. 14, 2021, 9 pages.
AU2017335758, "First Examination Report", dated Sep. 26, 2019, 3 pages.
AU2017335758, "Notice of Acceptance", dated Jan. 28, 2020, 3 pages.
CA Application No. CA3,037,755, Office Action, dated Mar. 3, 2020, 4 pages.
CA Application No. CA3,037,755, Office Action, dated Apr. 23, 2021, 7 pages.
CA Application No. CA3,037,755, Office Action, dated Aug. 18, 2020, 7 pages.
CN Application No. CN201780059419.6, Notice of Decision to Grant, dated Mar. 1, 2021, 6 pages.
CN Application No. CN201780059419.6, Office Action, dated Jul. 9, 2020, 13 pages.
CN Application No. CN201780059419.6, Office Action, dated Dec. 4, 2019, 19 pages.
EP Application No. EP17783660.8, Notice of Decision to Grant, dated Jul. 2, 2020, 2 pages.
IN Application No. 201917011138, "First Examination Report", dated May 18, 2020, 6 pages.
JP Application No. JP2019-516523, Notice of Decisionto Grant, dated Aug. 4, 2020, 3 pages.
JP Application No. JP2019-516523, Office Action, dated Mar. 17, 2020, 10 pages.
KR Application No. KR10-2019-7011173, Office Action, dated Jul. 14, 2020, 13 pages.
KR Application No. KR10-2019-7011173, Office Action, dated Jan. 21, 2021, 3 pages.
MX Application No. MX/A/2019/003432, Office Action, dated Aug. 12, 2020, 8 pages.
International Application No. PCT/US2017/053810, International Preliminary Report on Patentability, dated Apr. 11, 2019, 10 pages.
International Application No. PCT/US2017/053810, International Search Report and Written Opinion, dated Dec. 21, 2017, 13 pages.
RU Application No. 2019107737, Notice of Decision to Grant, dated Apr. 20, 2020, 16 pages.
RU Application No. 2019107737, Office Action, dated Jan. 22, 2020, 12 pages.
Zerbetto, "Optimal Design of a Permanent Magnet Heater for Aluminum Billets", Marcello Zerbetto Inovalab s.r.l., Oct. 15, 2014, 23 pages.
Brazilian Application No. BR112019005273-9, Office Action, dated Jul. 27, 2021, 5 pages.
Korean Application No. 10-2019-7011173, Notice of Decision to Grant, dated Jul. 21, 2021, 4 pages.

* cited by examiner

SYSTEMS AND METHODS FOR NON-CONTACT TENSIONING OF A METAL STRIP

CROSS REFERENCE TO RELATED APPLICATIONS

The present application is a division of co-pending U.S. patent application Ser. No. 15/716,559 entitled "SYSTEMS AND METHODS FOR NON-CONTACT TENSIONING OF A METAL STRIP" and filed on Sep. 27, 2017, which claims the benefit of U.S. Provisional Patent Application No. 62/400,426 entitled "ROTATING MAGNET HEAT INDUCTION" and filed on Sep. 27, 2016, and U.S. Provisional Patent Application No. 62/505,948 entitled "ROTATING MAGNET HEAT INDUCTION" and filed on May 14, 2017, the disclosures of which are hereby incorporated by reference in their entireties.

Additionally, the present application is related to U.S. Non-provisional patent application Ser. No. 15/717,698 to Andrew James Hobbis et al., entitled "SYSTEMS AND METHODS FOR THREADING A HOT COIL ON A MILL" filed Sep. 27, 2017, U.S. Non-provisional patent application Ser. No. 15/716,692 to David Anthony Gaensbauer et al., entitled "MAGNETIC LEVITATION HEATING OF METAL WITH CONTROLLED SURFACE QUALITY" filed Sep. 27, 2017, U.S. Non-provisional patent application Ser. No. 15/716,608 to David Anthony Gaensbauer et al., entitled "COMPACT CONTINUOUS ANNEALING SOLUTION HEAT TREATMENT" filed Sep. 27, 2017, and U.S. Non-provisional patent application Ser. No. 15/716,887 to Antoine Jean Willy Pralong et al., entitled "ROTATING MAGNET HEAT INDUCTION" filed Sep. 27, 2017, the disclosures of which are hereby incorporated by reference in their entirety.

FIELD OF THE INVENTION

This application relates to metal processing and, more particularly, to systems and methods for non-contact tensioning of a metal strip during metal processing.

BACKGROUND

During metal processing, sometimes a metal strip is unwound from a coil of the metal strip, processed with a mill or on a finishing line, and rewound as a finished coil. The rolling or finishing processes apply a defined tension to the metal strip. This tension is traditionally applied through an unwind coiler (also known as a decoiler) and a rewind coiler (also known as a recoiler), and is modified between the coilers using friction between rolls and the strip. These rolls are typically pinch rolls, bridle rolls, or rolling work rolls. However, the contact between the strip and the rolls, as well as the excessive strip tension from recoiling and decoiling operations, may cause damage such as scratching or other defects to the metal strip.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a method of processing a metal strip includes passing the metal strip adjacent a magnetic rotor and tensioning the metal strip through the magnetic rotor. In various examples, the magnetic rotor is spaced apart from the metal strip by a first distance. In some examples, tensioning the metal strip through the magnetic rotor includes rotating the magnetic rotor to induce a magnetic field into the metal strip such that the metal strip is tensioned in an upstream direction or a downstream direction.

According to various examples, a system for non-contact tensioning of a metal strip during metal processing is also provided. In some examples, the system includes a magnetic tensioner with at least one magnetic rotor. The magnetic rotor is spaced apart from a passline of a metal strip such that, during metal processing, the magnetic rotor is a distance from the metal strip. The magnetic rotor is selectively rotatable in a forward direction and a reverse direction such that the magnetic rotor induces a magnetic field into the metal strip and tensions the metal strip in an upstream direction or a downstream direction. In various examples, the magnetic rotor is vertically adjustable such that a distance between the magnetic rotor and the metal strip is adjusted. In certain examples, vertically adjusting the distance between the magnetic rotor and the metal strip adjusts the amount of tension acting on the metal strip from the magnetic rotor. In other examples, a rotational speed of the magnetic rotor may be adjusted to adjust the amount of tension acting on the metal strip from the magnetic rotor.

According to certain examples, a method of processing a metal strip includes passing the metal strip adjacent a magnetic rotor while passing the metal strip from a coil of the metal strip supported on an unwind coiler to a first work stand of a metal processing line downstream from the unwind coiler. In some examples, the magnetic rotor is spaced apart from the metal strip by a first distance. In various examples, the method also includes rotating the magnetic rotor to induce a magnetic field into the metal strip such that the metal strip is tensioned in an upstream direction or a downstream direction between the unwind coiler and the first work stand.

According to some examples, a method of processing a metal strip includes: passing the metal strip adjacent a magnetic rotor, detecting a first unwind tension in the metal strip downstream from the magnetic rotor, and detecting a second unwind tension in the metal strip upstream from the magnetic rotor. In some examples, the magnetic rotor is spaced apart from the metal strip by a first distance. In various examples, the method includes rotating the magnetic rotor to induce a magnetic field into the metal strip such that the metal strip is tensioned in an upstream direction or a downstream direction and a tension from the magnetic rotor reduces the second unwind tension while maintaining the first unwind tension.

According to various examples, a method of processing a metal strip includes passing the metal strip adjacent a magnetic rotor while passing the metal strip from a last work stand of a metal processing line to a rewind coiler downstream from the last work stand. In certain cases, the magnetic rotor is spaced apart from the metal strip by a first distance. In some examples, the method includes rotating the magnetic rotor to induce a magnetic field into the metal strip such that the metal strip is tensioned in an upstream direction or a downstream direction between the last work stand and the rewind coiler.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
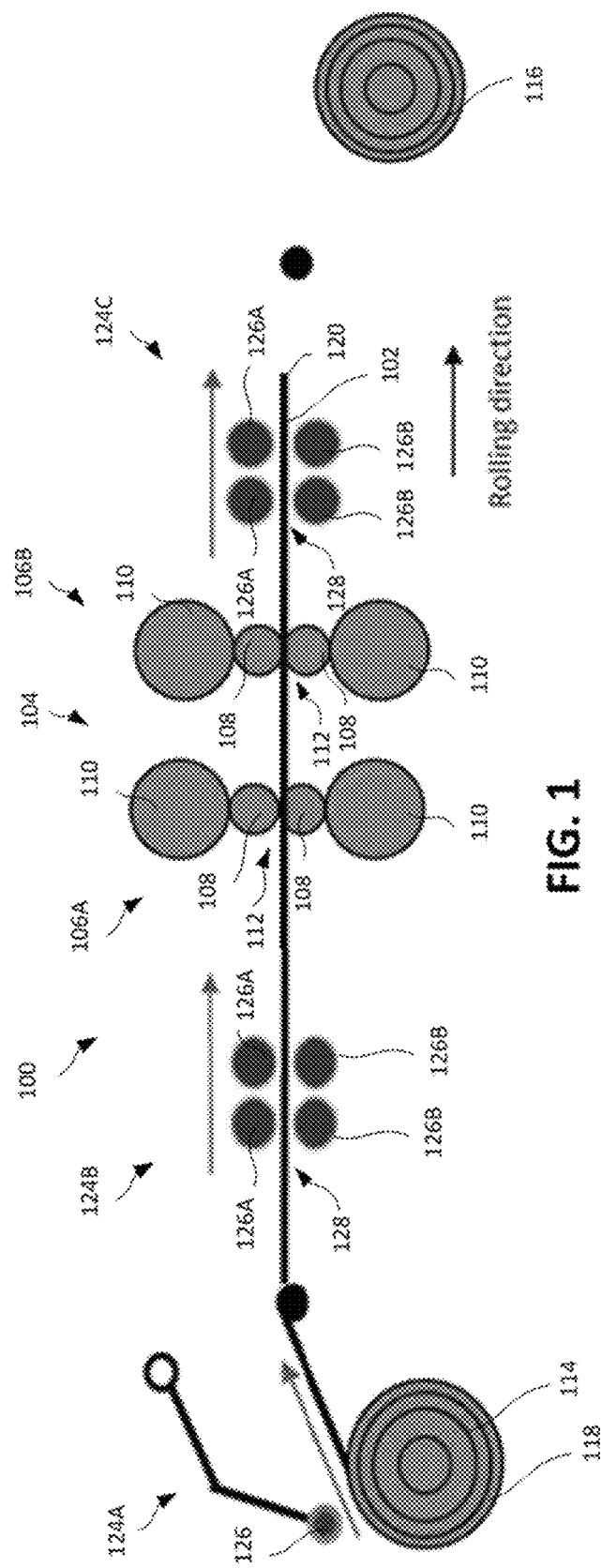
FIG. 1 is a schematic of a metal processing system according to aspects of the current disclosure.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed are systems and methods for non-contact tensioning of a metal strip during various stages of metal processing, including, but not limited to, unwinding a coil of the metal strip, threading the metal strip to a processing line, processing the metal strip with the processing line (e.g., rolling, slitting, leveling, and/or heat treating the metal strip), and rewinding the metal strip into a coil. Aspects and features of the present disclosure can be used with various suitable metal strips, and may be especially useful with metal strips of aluminum or aluminum alloys. Specifically, desirable results can be achieved when the metal strips are alloys such as 2xxx series, 3xxx series, 4xxx series, 5xxx series, 6xxx series, 7xxx series, or 8xxx series aluminum alloys. For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

In some cases, the systems and methods disclosed herein may be used with non-ferrous materials, including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal, non-metal or combination of materials. The article may include monolithic materials, as well as non-monolithic materials such as roll-bonded materials, clad materials, composite materials (such as but not limited to carbon fiber-containing materials), or various other materials. In one non-limiting example, the systems and methods can be used to heat metal articles such as aluminum metal strips, slabs, blanks, or other articles made from aluminum alloys, including aluminum alloys containing iron.

As used herein, the terms "above," "below," "vertical," and "horizontal" are used to describe relative orientations with respect to a metal strip or substrate as if the metal strip were moving in a horizontal direction with its top and bottom surfaces generally parallel to the ground. The term "vertical" as used herein can refer to a direction perpendicular to a surface (e.g., top or bottom surface) of the metal strip, regardless of the orientation of the metal strip. The term "horizontal" as used herein can refer to a direction parallel to a surface (e.g., top or bottom surface) of the metal strip, such as a direction parallel to the direction of travel of a moving metal strip, regardless of the orientation of the metal strip. The terms "above" and "below" can refer to locations beyond top or bottom surfaces of a metal strip, regardless of the orientation of the metal strip.

An example of a tensioning system 100 for non-contact tensioning of a metal strip 102 during metal processing is illustrated in FIG. 1. In various examples, the tensioning system 100 may be used with a processing line. In some examples and as illustrated in FIG. 1, the processing line includes a rolling mill 104, although various other metal processing equipment may be provided with the processing line in addition to or in place of the rolling mill 104.

In various cases, the rolling mill 104 includes at least one work stand 106. In some examples, the rolling mill 104 includes a single work stand 106 or a plurality of work stands 106, such as two work stands 106, three work stands 106, four work stands 106, five work stands 106, or any other desired number of work stands 106. In the example illustrated in FIG. 1, the rolling mill 104 includes two work stands 106 (a first work stand 106A and a second work stand 106B). Each work stand 106A-B includes a pair of vertically aligned work rolls 108. In some examples, the work stands 106A-B also include backup rolls 110 that support the work rolls 108. In various examples, the work stands 106A-B also include intermediate rolls. A roll gap 112 is defined between the work rolls 108 of each work stand 106A-B.

During processing, the metal strip 102 is passed through the roll gap 112 such that the work rolls 108 reduce the thickness of the metal strip 102 to a desired thickness and impart particular properties on the metal strip 102. The particular properties imparted may depend on the composition of the metal strip 102. In some examples, the rolling mill 104 may be a hot rolling mill that is configured to roll the metal strip 102 when the temperature of the metal strip 102 is above the recrystallization temperature of the metal strip 102. In other examples, the rolling mill 104 may be a cold rolling mill that is configured to roll the metal strip 102 when the temperature of the metal strip 102 is below the recrystallization temperature of the metal strip 102. In various other examples, the rolling mill 104 may be a warm rolling mill that is configured to roll the metal strip 102 when the temperature of the metal strip 102 is below the recrystallization temperature but above the temperature during cold rolling.

In some examples, the system 100 includes an unwind coiler 114 and a rewind coiler 116. During metal processing, the unwind coiler 114 supports a coil 118 of the metal strip 102 and unwinds the metal strip 102 for processing by the processing line. In some examples, after being processed by the processing line, the rewind coiler 116 rewinds the metal strip 102.

During some stages of metal processing, portions of the metal strip 102 such as portions near a leading edge 120 and/or portions near a trailing edge 122 (see FIG. 7) of the metal strip 102 may be contacted by various pieces of equipment. For example, traditionally, the metal strip 102 may be contacted by rolls during threading, rewinding, and tailing-out of the metal strip 102 among others. This contact may cause surface damage in the metal strip 102, which may damage and/or decrease the quality of those portions of the metal strip 102. Many times, these damaged portions are unsuitable for consumer needs and are discarded.

In addition to surface damage during metal processing, various tension defects including, but not limited to, thickness variations and/or shape variations in the metal strip 102 may also be imparted into the metal strip 102 during metal processing due to various factors. For example, in some cases, the unwind coiler 114 and/or the rewind coiler 116 may not be perfectly cylindrical (e.g., they may be cam-shaped or various other shapes), and as the coilers 114, 116 rotate to unwind or rewind the metal strip 102, the shape of the coilers 114, 116 causes tension variations in the metal strip 102. These tension variations may result in various tension-induced defects in the metal strip 102. The metal strip 102 may be especially prone to tension-induced defects if the metal strip is a hot, surface-sensitive strip 102.

In various examples, to minimize surface damage and tension defects in the metal strip 102 (and thereby produce a metal strip 102 with improved quality), the tensioning system 100 includes at least one magnetic tensioner 124 that is configured to impart tension forces in the metal strip 102 during metal processing without contacting the metal strip 102. By imparting tension forces in the metal strip 102, the magnetic tensioner 124 may control the tension in the metal strip 102 at various locations along the metal strip 102 and guide or position the metal strip 102 while minimizing surface damage or other defects in the metal strip 102 as described in detail below.

In the non-limiting example illustrated in FIG. 1, the system 100 includes three magnetic tensioners 124A-C. In this example, the magnetic tensioner 124A is positioned proximate to the unwind coiler 114, the magnetic tensioner 124B is positioned between the unwind coiler 114 and the rolling mill 104 (or processing line), and the magnetic tensioner 124C is positioned between the rolling mill 104 and the rewind coiler 116. In various other examples, any desired number of magnetic tensioners 124 may be provided at various locations as desired. For example, in some cases, the magnetic tensioner 124A may be omitted. In other examples, only the magnetic tensioner 124B or the magnetic tensioner 124C may be included. In various other examples, magnetic tensioners 124 in addition to or in place of the magnetic tensioners 124A-C may be provided at various other locations along the path of the metal strip 102 where tension control and/or guiding of the metal strip 102 may be desirable. As such, the number and location of magnetic tensioners 124 should not be considered limiting on the current disclosure.

Each magnetic tensioner 124A-C includes at least one magnetic rotor 126. As described in detail below, in some examples, the magnetic tensioners 124A-C may include more than one magnetic rotor 126. For example, each magnetic tensioner 124A-C may include one magnetic rotor 126, two magnetic rotors 126, three magnetic rotors 126, four magnetic rotors 126, five magnetic rotors 126, six magnetic rotors 126, or more than six magnetic rotors 126. In various examples, the number of magnetic rotors 126 included with each magnetic tensioner 124A-C need not be the same, although two or more of the magnetic tensioners 124A-C can have the same number of magnetic rotors 126 in other examples. The magnetic rotors 126 are spaced apart from the passline of the metal strip 102 such that, during metal processing, the magnetic rotors 126 are in a non-contacting configuration with the metal strip 102. In various examples, the magnetic rotors 126 are vertically adjustable such that a distance between a particular magnetic rotor 126 and the metal strip 102 may be varied.

Each magnetic rotor 126 includes one or more permanent magnets or electromagnets. The magnetic rotors 126 are rotatable in a forward direction (a clockwise direction in FIG. 1) or a reverse direction (a counter-clockwise direction in FIG. 1). In various examples, the magnetic rotors 126 may be rotated through various suitable methods including, but not limited to, electric motors, pneumatic motors, another magnetic rotor, or various other suitable mechanisms. In various examples, the magnetic rotors 126 may change their direction of rotation during processing. The magnetic rotors 126 may rotate at various rotational speeds, such as from about 100 rpm to about 5000 rpm. In one non-limiting example, the magnetic rotors 126 rotate at about 1800 revolutions per minute, although various other rotational speeds may be utilized. As the magnetic rotors 126 rotate, the magnets induce a magnetic field into the metal strip 102 such that the metal strip 102 is tensioned in an upstream direction or a downstream direction. In various examples, the magnetic rotors 126 are configured to induce a magnetic field that imparts tangential tension forces that are greater than radial tension forces. For example, in some cases, the ratio of tangential tension forces to radial tension forces may be from about 1:10 to about 10:1. In some examples, in addition to tensioning the metal strip 102, rotating the magnetic rotors 126 may also provide vertical stabilization that allows the metal strip 102 to pass over and/or between the magnetic rotors 126 without contacting the magnetic rotors 126 (e.g., the magnetic rotors 126 levitate or float the metal strip 102). For example, in some cases, the magnetic rotors 126 impart a force that is perpendicular or substantially perpendicular to a surface of the metal strip 102 to float the metal strip 102 and minimize and/or eliminate contact between the rotors 126 and the metal strip 102.

In some examples, the magnetic tensioner 124A is a hold down roll that includes one or more magnetic rotors 126. In various cases, the magnetic tensioner 124B may be between the unwind coiler 114 and the rolling mill 104 to guide and control tension in the metal strip 102 upstream of the rolling mill 104. In a similar manner, the magnetic tensioner 124C may be between the rolling mill 104 and the rewind coiler 116 to guide and control tension in the metal strip 102 downstream of the rolling mill 104.

As illustrated in FIG. 1, in some examples, the magnetic tensioner 124B and/or the magnetic tensioner 124C includes a set of magnetic rotors having a top magnetic rotor 126A and a bottom magnetic rotor 126B. In other examples, the magnetic tensioner 124B and/or the magnetic tensioner 124C includes only a bottom magnetic rotor 126B, only a top magnetic rotor 126A, or various combinations of top magnetic rotors 126A and bottom magnetic rotors 126B. In certain examples, the magnetic tensioner 124B and/or the magnetic tensioner 124C includes a plurality of sets of magnetic rotors. As such, the number of sets of magnetic rotors should not be considered limiting on the current disclosure. In some cases, the top magnetic rotor 126A is vertically offset from the bottom magnetic rotor 126B such that a gap 128 is defined between the rotors 126A-B. As illustrated in FIG. 1, during processing, the metal strip 102 is passed through the gap 128. In other examples, the top magnetic rotor 126A may be horizontally offset from the bottom magnetic rotor 126B such that the magnetic rotors 126A-B are not vertically aligned.

In various examples, the top magnetic rotor 126A and the bottom magnetic rotor 126B are vertically adjustable such that a size of the gap 128, which is a distance from the top magnetic rotor 126A to the bottom magnetic rotor 126B, may be varied. In various examples, the gap 128 of the magnetic rotors 126A-B may be controlled through various actuators including, but not limited to hydraulic pistons, screw drives, or other suitable actuators. In certain examples, the gap 128 may be varied between a minimum gap size and a maximum gap size. In some examples, the magnitude of the tension force imparted by the magnetic rotors 126A-B into the metal strip 102 may be maximized when the distance between the metal strip 102 and the magnetic rotors 126A-B is minimized. Conversely, the magnitude of the tension force imparted by the magnetic rotors 126A-B may be minimized when the distance between the metal strip 102 and the magnetic rotors 126A-B is maximized. The top magnetic rotor 126A may be vertically adjustable independent from or in conjunction with the bottom magnetic rotor 126B. In some examples, the top magnetic rotor 126A and the bottom magnetic rotor 126B rotate in the same direction, although they need not. For example, in some cases, the top magnetic rotor 126A and the bottom magnetic rotor 126B may rotate in opposite directions. In various examples, the magnetic rotors 126A-B of one set of magnetic rotors may rotate in the same or in a different direction as the corresponding magnetic rotors 126A-B of another set of magnetic rotors. In various examples, a configuration of the magnetic rotors 126 in the magnetic tensioner 124B may be the same or may be different from the configuration of the magnetic rotors 126 in the magnetic tensioner 124C.

In certain examples, the tensioning system 100 includes various sensors or monitors at various positions along the path of the metal strip 102. These sensors may detect and monitor the position of the metal strip 102, the tension in the metal strip 102 at the location of the sensor, the thickness profile of the metal strip 102 at the location of the sensor, the temperature in the metal strip 102 at the location of the sensor, and/or various other information about the metal strip 102 as it is processed. In some examples, the information gathered by the sensors may be used by a controller to adjust the magnetic rotors 126 (e.g., rotational speed, direction of rotation, distance from metal strip 102, etc.) and thereby control the metal strip 102.

FIGS. 2-7 illustrate non-limiting examples of methods of controlling tension and/or guiding the metal strip 102 with the magnetic tensioners 124A-C. The illustrated methods may be used alone or in various combinations as desired.

Figure 2:
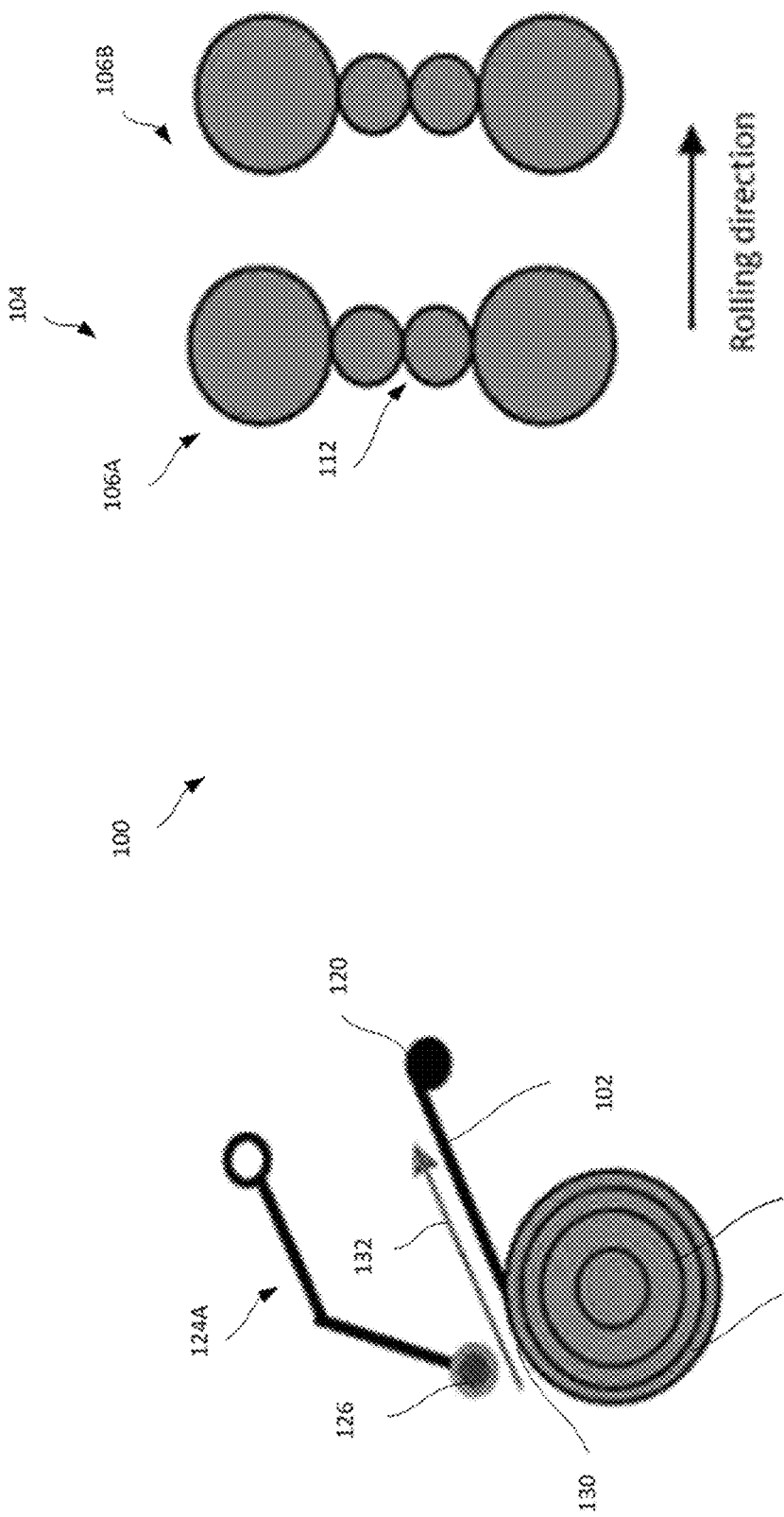
FIG. 2 is a schematic of a portion of the metal processing system of FIG. 1.

FIG. 2 illustrates a non-limiting example of a threading process using the magnetic tensioner 124A. In some examples, the method includes threading the metal strip 102 with minimal or no contact between the magnetic rotors 126 and the metal strip 102. In various examples, the method of threading the metal strip 102 with the magnetic tensioner 124A includes receiving the coil 118 of the metal strip 102 on the unwind coiler 114 and adjusting the magnetic tensioner 124A such that the magnetic rotor 126 of the magnetic tensioner 124A is separated from the metal strip 102 by a predetermined distance. In various cases, the method includes positioning the magnetic rotor 126 of the magnetic tensioner 124A proximate to an unroll point 130 wherein the metal strip 102 is unwound from the coil 118. In some examples, a weld securing the leading edge 120 of the metal strip 102 to the coil 118 may be broken prior to unwinding and threading the metal strip 102.

In various cases, the method includes rotating the magnetic rotor 126 such that a radial tension force (or a "hold down force") is applied to the strip to minimize or eliminate relative motion and clock springing of the outer lap of the metal strip 102 to the coil 118. The hold down force may be beneficial during the threading process (and if strip tension is not established in the line) to avoid scratches and clock springing. In some examples, the magnetic rotor 126 of the magnetic tensioner 124A imparts a tension force 132 such that it is greater in the tangential direction than in the radial direction, although it need not. In some examples, the magnetic rotor 126 of the magnetic tensioner 124A continues to impart the tension force 132 and/or hold down force in the metal strip 102 until the leading edge 120 is threaded into the roll gap 112 of the work stand 106A. In other examples, the magnetic rotor 126 may continue to impart the tension force 132 and/or hold down force into the metal strip 102 after the leading edge 120 is threaded into the roll gap 112.

In some cases, the method also includes rotating the magnetic rotor 126 such that the tension force 132 is imparted into the metal strip 102 that advances the metal strip 102 downstream. In some examples, the tension imparted by the magnetic tensioner 124A advances the metal strip 102 to guide the leading edge 120 of the metal strip 102 into the roll gap 112. In other examples, the tension imparted from the magnetic tensioner 124A may also advance the metal strip 102 after the leading edge 120 of the metal strip 102 is threaded into the roll gap 112. In certain examples, the magnetic rotor 126 of the magnetic tensioner 124A is rotated in the reverse direction to impart the tension force 132 in the metal strip 102. In various examples, the tension force 132 may be from about 0.5 MPa to about 50 MPa. In various cases, the magnitude of the tension force 132 is controlled by vertically adjusting the magnetic rotor 126 to increase or decrease the distance between the magnetic rotor 126 and the metal strip 102. The magnitude of the tension force 132 may also be controlled by adjusting the rotational speed of the magnetic rotor 126 and/or the direction of rotation of the magnetic rotor 126.

Figure 3:
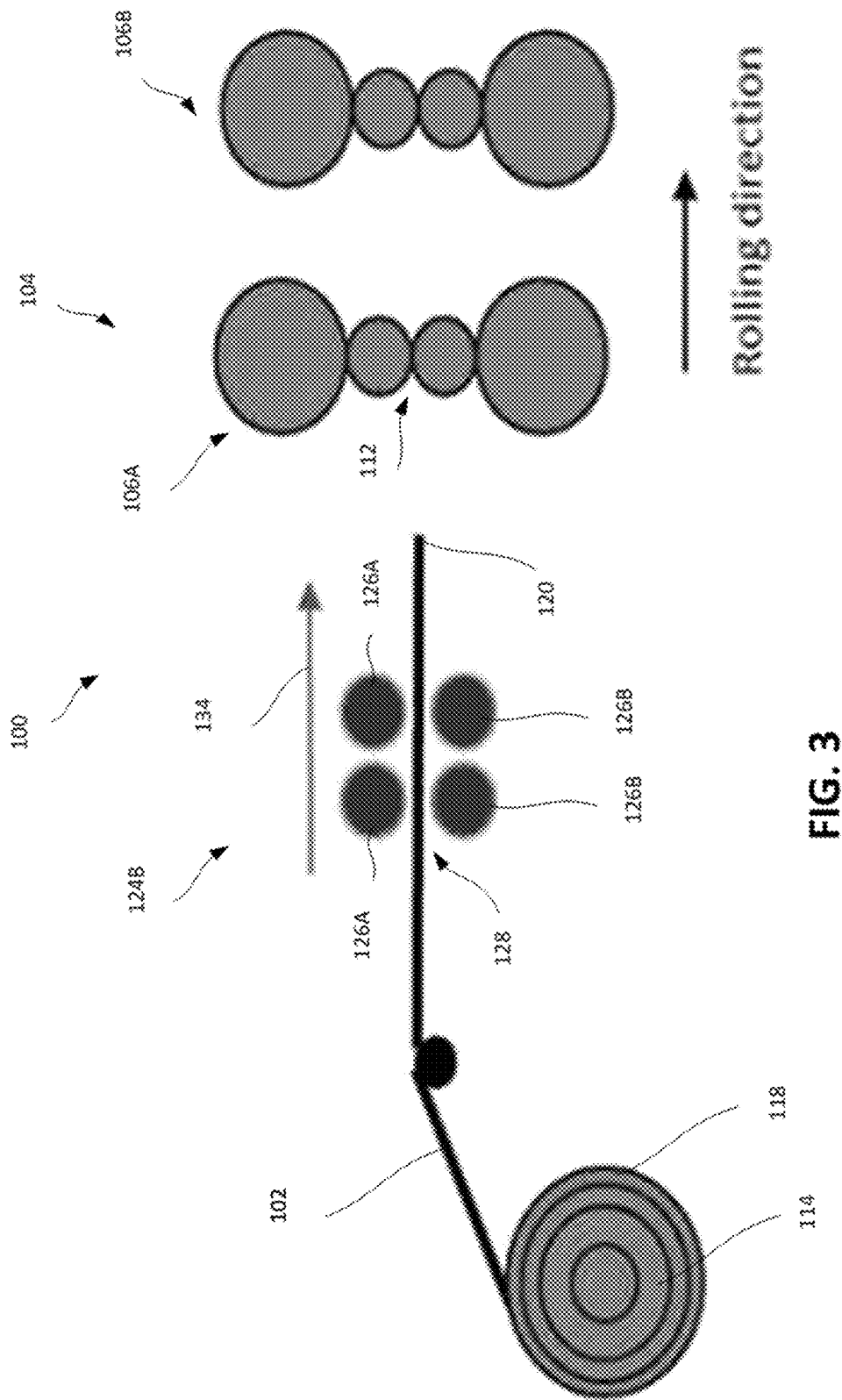
FIG. 3 is a schematic of another portion of the metal processing system of FIG. 1.

FIG. 3 illustrates a non-limiting example of a threading process using the magnetic tensioner 124B. In some examples, the method includes threading the metal strip 102 with minimal or no contact between the magnetic rotors 126A-B and the metal strip 102. In various examples, the threading process illustrated in FIG. 3 may be used in conjunction with or in place of the threading process illustrated in FIG. 2.

In the method illustrated in FIG. 3, the metal strip 102 is passed through the gap 128 between the top magnetic rotor 126A and the bottom magnetic rotor 126B. The top magnetic rotor 126A and the bottom magnetic rotor 126B are rotated such that a tension force 134 is imparted into the metal strip 102 that advances the metal strip 102 downstream. In some examples, the top magnetic rotor 126A is rotated in the reverse direction and the bottom magnetic rotor 126B is rotated in the forward direction to impart the tension force 134, or vice versa. In various examples, the tension force 134 applied by a single pair of rotors may be from about 0.5 MPa to about 50 MPa depending on the gap 128, the rotational speed, the strip thickness, the number of rotors, and the design of the rotors, among other factors. In various examples, the magnitude of the tension force 134 may be controlled by changing the size of the gap 128, the rotational speed of the magnetic rotors 126A-B, and/or the direction of rotation of the magnetic rotors 126A-B. In some examples, applying the tension force 134 at intermediate points along the path of the metal strip 102 between the unwind coiler 114 and the rolling mill 104 improves the ability to steer and center the leading edge 120 of the metal strip 102 into the roll gap 112 of the first work stand 106A. In some examples, the magnetic rotors 126A-B of the magnetic tensioner 124B continue to impart the tension force 134 in the metal strip 102 until the leading edge 120 is threaded into the roll gap 112 of the work stand 106A. In other examples, the magnetic rotors 126A-B may continue to impart the tension force 134 into the metal strip 102 after the leading edge 120 is threaded into the roll gap 112. In other examples, the magnetic rotors 126A-B may reverse the tension force 134 into the metal strip 102 after the leading edge 120 is threaded into the roll gap 112.

Figure 4:
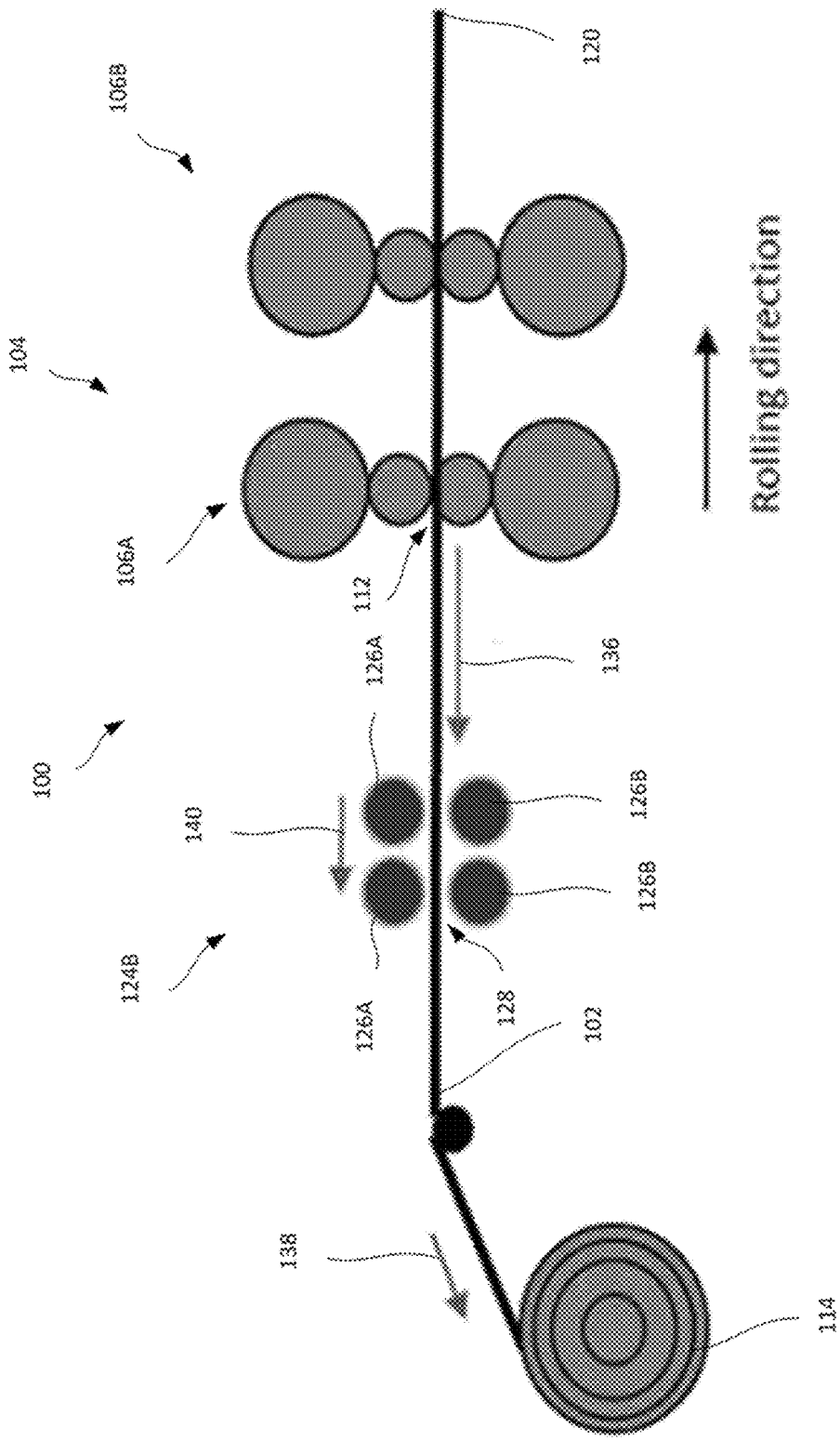
FIG. 4 is a schematic of another portion of the metal processing system of FIG. 1.

FIG. 4 illustrates a non-limiting example of a method of controlling strip tension force 136 at the roll gap 112 with the magnetic tensioner 124B. In other examples, controlling the strip tension force 136 may occur at various other locations upstream from the magnetic tensioner 124B. In some examples, the method includes controlling the strip tension force 136 with minimal or no contact between the magnetic rotors 126A-B and the metal strip 102. In various examples, the method illustrated in FIG. 4 may optionally be used in conjunction with the threading process of FIG. 2 and/or FIG. 3. In some examples, the method includes imparting a second tension force 140 after threading the metal strip with the method illustrated in FIG. 2 and/or FIG. 3. In such cases, the method includes changing the direction of rotation of at least some of the magnetic rotors 126A-B from the direction of rotation in FIG. 3.

Traditionally, the strip tension force 136 at the roll gap 112 is controlled by the unwind tension force 138 induced in the metal strip 102 by the unwind coiler 114. However, controlling the strip tension force 136 through the unwind coiler 114 may cause variations in tension in the metal strip 102 because the unwind coiler 114 may not be perfectly cylindrical as described above. In addition, controlling the strip tension force 136 through the unwind coiler 114 may cause surface damage due to movement of the metal strip 102 during unwinding.

Through the magnetic tensioner 124B, the method includes imparting the second tension force 140 into the metal strip 102. By imparting the second tension force 140 at an intermediate position between the unwind coiler 114 and the rolling mill 104, the second tension force 140 and/or the unwind tension force 138 may be used to control the strip tension force 136 (i.e., the strip tension force 136 is a sum of the unwind tension force 138 and the second tension force 140). In various examples, imparting the second tension force 140 includes rotating the top magnetic rotor 126A and the bottom magnetic rotor 126B such that the metal strip 102 is tensioned in a direction opposite a rolling direction of the metal strip 102. In some examples, the top magnetic rotor 126A is rotated in the forward direction and the bottom magnetic rotor 126B is rotated in the reverse direction to impart the second tension force 140, or vice versa. In various examples, the second tension force 140 may be from about 0.5 MPa to about 50 MPa. In various examples, the magnitude of the tension force 140 may be controlled by changing the size of the gap 128, the rotational speed of the magnetic rotors 126A-B, and/or the direction of rotation of the magnetic rotors 126A-B. In some examples where multiple sets of magnetic rotors 126A-B are provided, the first set of magnetic rotors may rotate in a first configuration and a second set of magnetic rotors may rotate in a second configuration opposite of the first configuration to provide the desired magnitude of the second tension force 140.

In some examples, the method includes minimizing the unwind tension force 138 by providing the second tension force 140. Minimizing the unwind tension force 138 may minimize damage or defects caused by the unwind coiler 114 during unwinding of the metal strip 102 from the unwind coiler 114. In certain examples, the second tension force 140 is a replacement tension force for the unwind tension force 138. In some cases, the magnitude of the second tension force 140 is greater than or equal to the unwind tension force 138 such that the strip tension force 136 is maintained or controlled as desired while the unwind tension force 138 is minimized or reduced.

Figure 5:
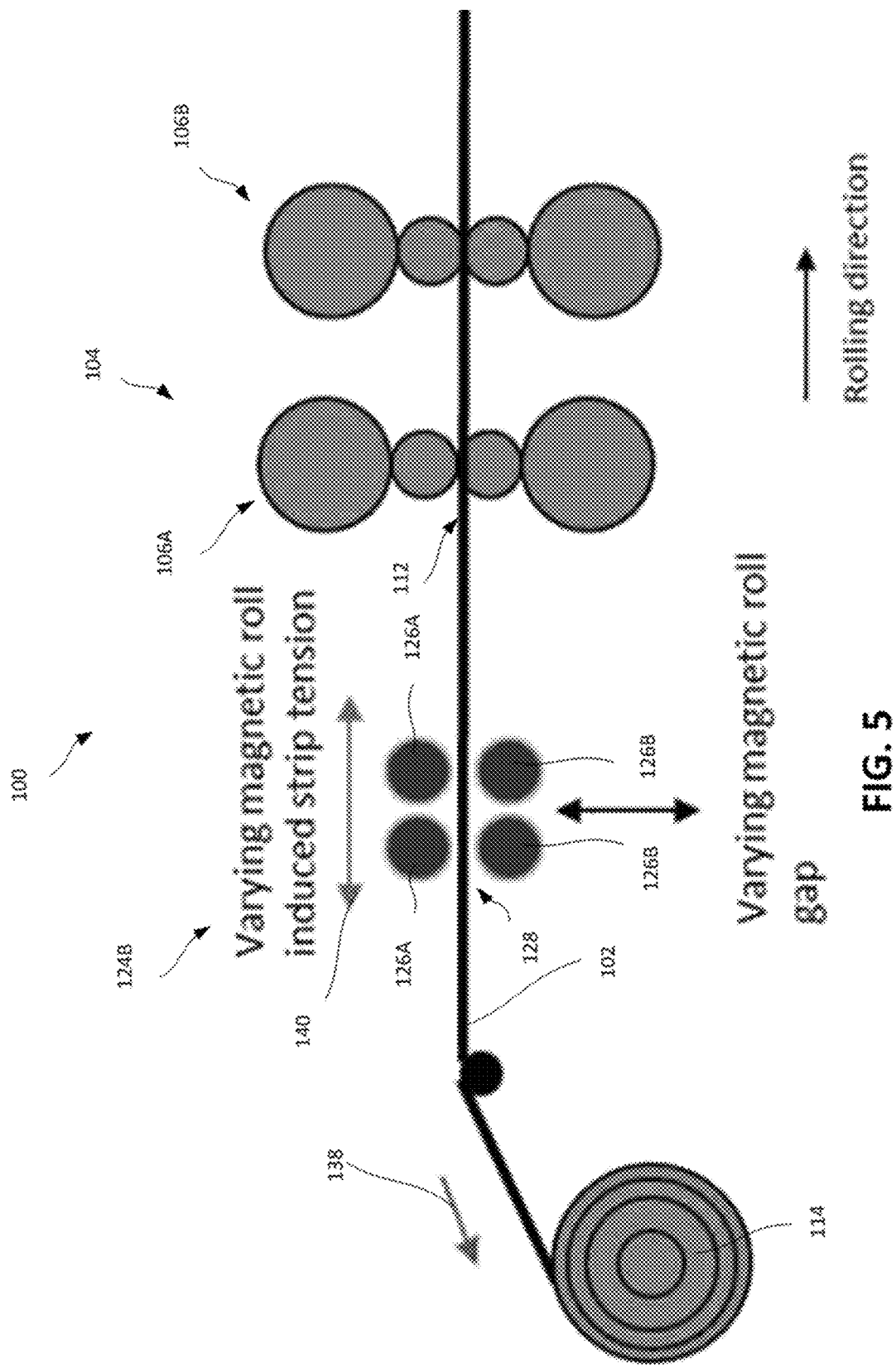
FIG. 5 is a schematic of another portion of the metal processing system of FIG. 1.

Referring to FIG. 5, in some examples, the method includes modulating the unwind tension force 138 by adjusting the magnetic rotors 126A-B of the magnetic tensioner 124B. In some examples, the method includes modulating the unwind tension force 138 with minimal or no contact between the magnetic rotors 126A-B and the metal strip 102. In some examples, modulating the unwind tension force 138 includes varying the size of the gap 128. For example, in some cases, modulating the unwind tension force 138 includes rapidly moving the magnetic rotors 126A-B in the vertical direction such that the size of the gap 128 is varied to vary the magnitude of the second tension force 140. In various examples, modulating the unwind tension force 138 includes varying a direction of the second tension force 140 by changing the direction of rotation of at least one of the magnetic rotors 126A-B. In certain examples, modulating the unwind tension force 138 includes varying a rotational speed of the at least one of the magnetic rotors 126A-B. In certain examples, modulating the unwind tension force 138 includes varying a distance between adjacent top magnetic rotors 126A or adjacent bottom magnetic rotors 126B in a longitudinal direction. Various other adjustments to the magnetic rotors 126A-B may be used to modulate or change the magnetic rotors 126A-B and thus the unwind tension force 138. By modulating the unwind tension force 138, the magnetic tensioner 124B can offset unwind coil-induced disturbances and therefore reduce wrap-to-wrap damage at the coil and thickness variations or disturbances.

Figure 6:
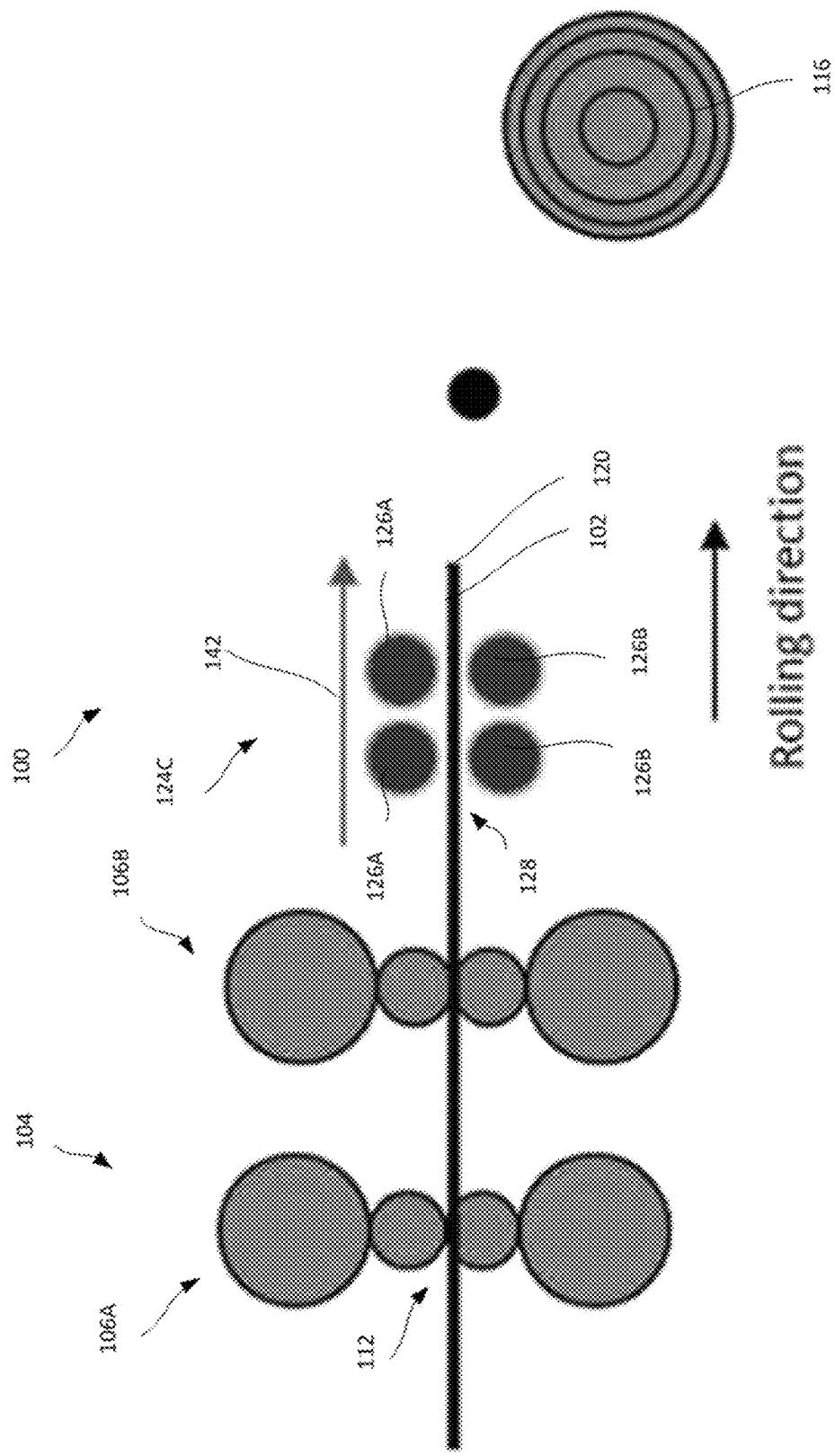
FIG. 6 is a schematic of another portion of the metal processing system of FIG. 1.

FIG. 6 illustrates a non-limiting example of a method of guiding the metal strip 102 from the rolling mill 104 to the rewind coiler 116 with the magnetic tensioner 124C. In some examples, the method includes guiding the metal strip 102 with minimal or no contact between the magnetic rotors 126A-B and the metal strip 102.

In some examples, similar to the method illustrated in FIG. 3, the method includes rotating the top magnetic rotor 126A and the bottom magnetic rotor 126B of the magnetic tensioner 124C such that an unwind tension force 142 is imparted into the metal strip that advances the metal strip 102 downstream. In some examples, the top magnetic rotor 126A is rotated in the reverse direction and the bottom magnetic rotor 126B is rotated in the forward direction to impart the unwind tension force 142, or vice versa. In various examples, the unwind tension force 142 may be from about 0.5 MPa to about 50 MPa. In various examples, the magnitude of the unwind tension force 142 may be controlled by changing the size of the gap 128, the rotational speed of the magnetic rotors 126A-B, and/or the direction of rotation of the magnetic rotors 126A-B. In some examples, applying the unwind tension force 142 at intermediate points along the path of the metal strip 102 between the rolling mill 104 and the rewind coiler 116 improves the ability to steer and center the leading edge 120 of the metal strip 102 towards the center of the rewind coiler 116 such that the metal strip 102 is centered while it is rewound.

In various examples, the magnetic rotors 126A-B of the magnetic tensioner 124C are configured to impart the unwind tension force 142 that is greater in the tangential direction than in the radial direction such that the unwind tension force 142 advances the metal strip 102 towards the rewind coiler 116. In some examples, the magnetic rotors 126A-B of the magnetic tensioner 124C continue to impart the unwind tension force 142 in the metal strip 102 until the leading edge 120 is positioned on the rewind coiler 116 and/or the tension is established on the rewind coiler 116. In other examples, the magnetic rotors 126A-B may continue to impart the unwind tension force 142 into the metal strip 102 after the leading edge 120 is positioned on the rewind coiler 116.

In some examples, the method includes modulating a rewind tension force imparted into the metal strip 102 by the rewind coiler 116 while rewinding the metal strip 102 on the rewind coiler 116. Similar to the method illustrated in FIG. 5, modulating the rewind tension force includes varying the size of the gap 128, varying a direction of the unwind tension force 142, and/or varying a rotational speed of at least one of the magnetic rotors 126A-B. By modulating the unwind tension force 142, the magnetic tensioner 124C can offset unwind coil-induced disturbances and therefore reduce wrap-to-wrap damage at the rewind coil and thickness variations or disturbances.

Figure 7:
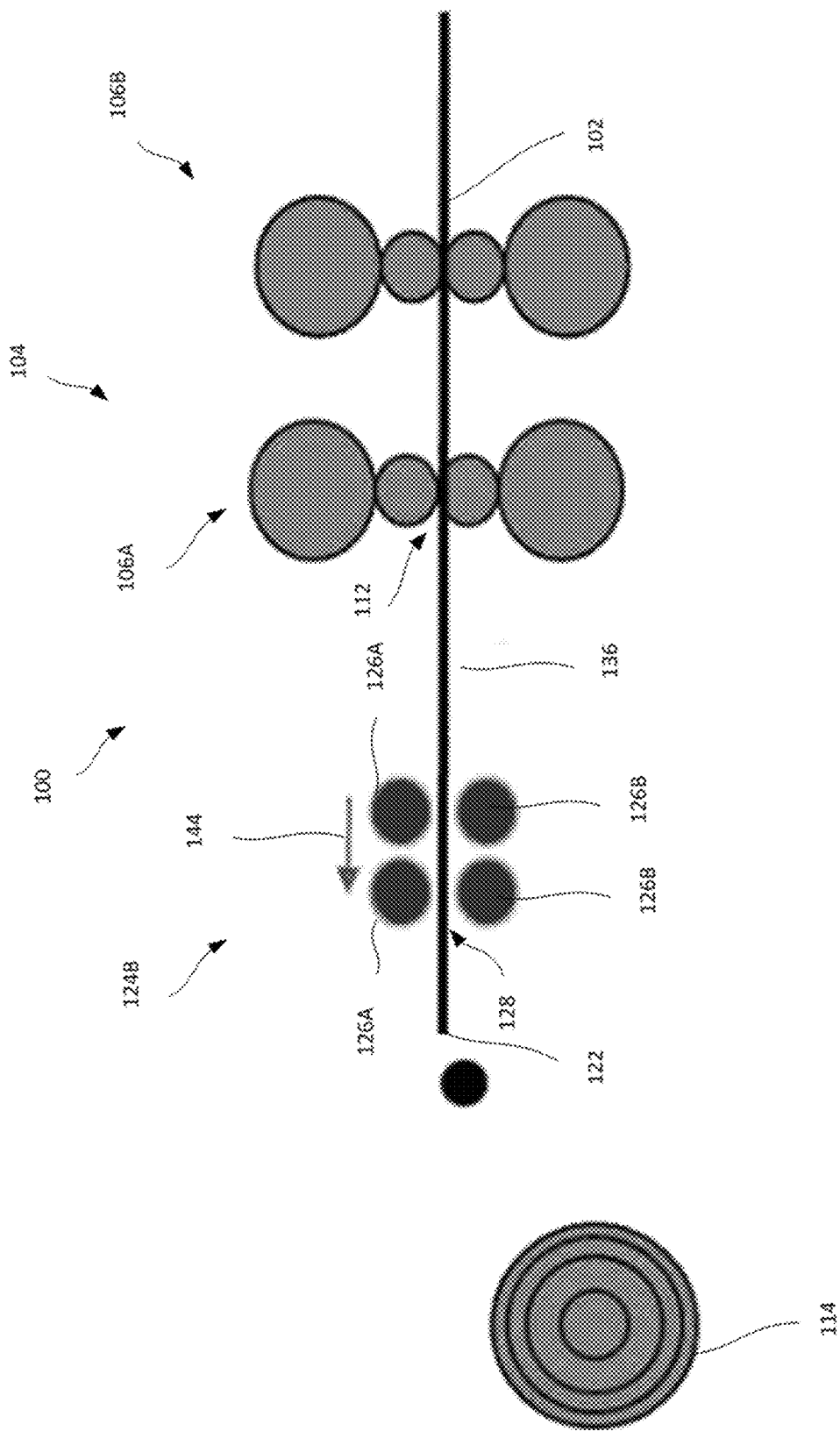
FIG. 7 is a schematic of another portion of the metal processing system of FIG. 1.

FIG. 7 illustrates a non-limiting example of a method of guiding the trailing edge 122 of the metal strip 102 with the magnetic tensioner 124B during tailing-out from the unwind coiler 114. During tailing-out from the unwind coiler 114, the metal strip 102 has unwrapped from the unwind coiler 114, and the unwind coiler 114 no longer provides the unwind tension force 138. To keep the unwind tension and the metal strip 102 centered as the trailing edge 122 moves towards the rolling mill 104, the method includes rotating the magnetic rotors 126A-B of the magnetic tensioner 124B such that a tension force 144 is applied in the reverse direction, or away from the rolling mill 104. In various examples, the magnitude of the tension force 144 may be controlled by changing the size of the gap 128, the rotational speed of the magnetic rotors 126A-B, and/or the direction of rotation of the magnetic rotors 126A-B. In some examples, applying the tension force 144 at intermediate points along the path of the metal strip 102 between the unwind coiler 114 and the rolling mill 104 improves the ability to steer and center the trailing edge 122 of the metal strip 102 into the roll gap 112 of the first work stand 106A.

Figure 8:
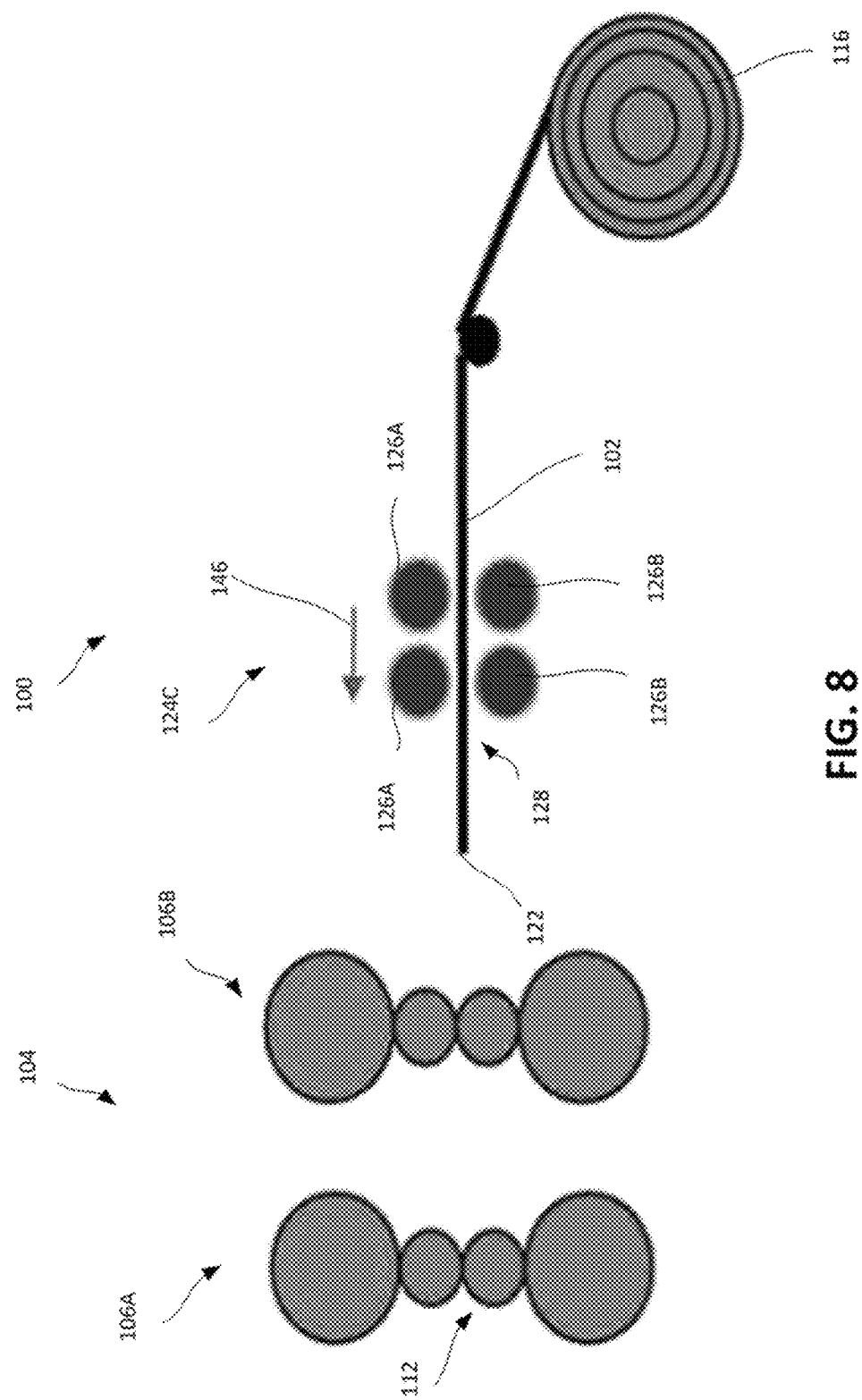
FIG. 8 is a schematic of another portion of the metal processing system of FIG. 1.

FIG. 8 illustrates a non-limiting example of a method of guiding the trailing edge 122 with the magnetic tensioner 124C during tailing-out from the rolling mill 104. During tailing-out from the rolling mill 104, the metal strip 102 has exited the rolling mill 104, and the rolling mill 104 no longer provides a tension force on the metal strip 102. To keep the recoiling strip tension and the metal strip 102 centered as the trailing edge 122 moves towards the rewind coiler 116, the method includes rotating the magnetic rotors 126A-B of the magnetic tensioner 124C such that a tension force 146 is applied in the reverse direction, or away from the rewind coiler 116. In various examples, the magnitude of the tension force 146 may be controlled by changing the size of the gap 128, the rotational speed of the magnetic rotors 126A-B, and/or the direction of rotation of the magnetic rotors 126A-B. In some examples, applying the tension force 146 at intermediate points along the path of the metal strip 102 between the rolling mill 104 and the rewind coiler 116 improves the ability to steer and center the trailing edge 122 of the metal strip 102 onto the rewind coiler 116.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A method of processing a metal strip comprising: passing the metal strip adjacent a magnetic rotor, wherein the magnetic rotor is spaced apart from the metal strip by a first distance; and rotating the magnetic rotor to induce a magnetic field into the metal strip such that the metal strip is tensioned in an upstream direction or a downstream direction.

EC 2. The method of any of the preceding or subsequent example combinations, wherein passing the metal strip adjacent the magnetic rotor comprises passing the metal strip from a coil of the metal strip supported on an unwind coiler to a first work stand of a metal processing line downstream from the unwind coiler, and wherein tensioning the metal strip through the magnetic rotor comprises tensioning the metal strip between the unwind coiler and the first work stand.

EC 3. The method of any of the preceding or subsequent example combinations, wherein the magnetic rotor is a top magnetic rotor of a set of magnetic rotors comprising the top magnetic rotor and a bottom magnetic rotor vertically offset from the top magnetic rotor by a gap, wherein passing the metal strip adjacent the magnetic rotor comprises passing the metal strip through the gap, and wherein tensioning the metal strip comprises rotating the top magnetic rotor and the bottom magnetic rotor to induce the magnetic field into the metal strip such that the metal strip is tensioned.

EC 4. The method of any of the preceding or subsequent example combinations, wherein the top magnetic rotor and the bottom magnetic rotor are horizontally offset.

EC 5. The method of any of the preceding or subsequent example combinations, further comprising guiding a leading edge of the metal strip to a roll gap of the first work stand by tensioning the metal strip in the downstream direction.

EC 6. The method of any of the preceding or subsequent example combinations, wherein guiding the leading edge of the metal strip comprises centering the leading edge of the metal strip within the roll gap.

EC 7. The method of any of the preceding or subsequent example combinations, further comprising guiding a trailing edge of the metal strip to a roll gap of the first work stand by tensioning the metal strip in the upstream direction after the trailing edge has been unwrapped from the unwind coiler.

EC 8. The method of any of the preceding or subsequent example combinations, wherein guiding the trailing edge of the metal strip comprises centering the trailing edge of the metal strip within the roll gap.

EC 9. The method of any of the preceding or subsequent example combinations, further comprising: detecting a first unwind tension in the metal strip downstream from the magnetic rotor; detecting a second unwind tension in the metal strip upstream from the magnetic rotor; and tensioning the metal strip through the magnetic rotor such that a tension from the magnetic rotor reduces the second unwind tension while maintaining the first unwind tension.

EC 10. The method of any of the preceding or subsequent example combinations, wherein the first unwind tension is detected at a roll gap of the first work stand and the second unwind tension is detected at an unroll point of the metal strip from the unwind coiler.

EC 11. The method of any of the preceding or subsequent example combinations, further comprising: determining a tension at the unwind coiler; determining the tension added by the magnetic rotor; and calculating the tension at an entry of the work stand by summing the tension at the unwind coiler and the tension added by the magnetic rotor.

EC 12. The method of any of the preceding or subsequent example combinations, further comprising modulating the tension from the magnetic rotor by vertically adjusting the magnetic rotor relative to the metal strip to adjust the first distance.

EC 13. The method of any of the preceding or subsequent example combinations, further comprising modulating the tension from the magnetic rotor by adjusting a rotational speed of the magnetic rotor.

EC 14. The method of any of the preceding or subsequent example combinations, wherein passing the metal strip adjacent the magnetic rotor comprises passing the metal strip from a last work stand of a metal processing line to a rewind coiler downstream from the last work stand, and wherein tensioning the metal strip through the magnetic rotor comprises tensioning the metal strip between the last work stand and the rewind coiler.

EC 15. The method of any of the preceding or subsequent example combinations, wherein the magnetic rotor is a top magnetic rotor of a set of magnetic rotors comprising the top magnetic rotor and a bottom magnetic rotor vertically offset from the top magnetic rotor by a gap, wherein passing the metal strip adjacent the magnetic rotor comprises passing the metal strip through the gap, and wherein tensioning the metal strip comprises rotating the top magnetic rotor and the bottom magnetic rotor to induce the magnetic field into the metal strip such that the metal strip is tensioned.

EC 16. The method of any of the preceding or subsequent example combinations, wherein the top magnetic rotor and the bottom magnetic rotor are horizontally offset.

EC 17. The method of any of the preceding or subsequent example combinations, further comprising guiding a leading edge of the metal strip to the rewind coiler by tensioning the metal strip in the downstream direction.

EC 18. The method of any of the preceding or subsequent example combinations, wherein guiding the leading edge comprises centering the metal strip on the rewind coiler.

EC 19. The method of any of the preceding or subsequent example combinations, further comprising guiding a trailing edge of the metal strip to the rewind coiler by tensioning the metal strip in the upstream direction after the trailing edge has exited a roll gap of the last work stand.

EC 20. The method of any of the preceding or subsequent example combinations, wherein guiding the trailing edge of the metal strip comprises centering the trailing edge of the metal strip within the roll gap.

EC 21. The method of any of the preceding or subsequent example combinations, further comprising: detecting a first rewind tension in the metal strip downstream from the magnetic rotor; detecting a second rewind tension in the metal strip upstream from the magnetic rotor; and tensioning the metal strip through the magnetic rotor such that a tension from the magnetic rotor reduces the second rewind tension while maintaining the first rewind tension.

EC 22. The method of any of the preceding or subsequent example combinations, further comprising: determining a tension at the rewind coiler; determining the tension added by the magnetic rotor; and calculating the tension at an entry of the work stand by summing the tension at the rewind coiler and the tension added by the magnetic rotor.

EC 23. The method of any of the preceding or subsequent example combinations, further comprising modulating the tension from the magnetic rotor by vertically adjusting the magnetic rotor relative to the metal strip to adjust the first distance.

EC 24. The method of any of the preceding or subsequent example combinations, further comprising modulating the tension from the magnetic rotor by adjusting a rotational speed of the magnetic rotor.

EC 25. The method of any of the preceding or subsequent example combinations, wherein the first distance is from about 1 mm to about 10 m.

EC 26. The method of any of the preceding or subsequent example combinations, wherein the first distance is from about 1 mm to about 200 mm.

EC 27. The method of any of the preceding or subsequent example combinations, wherein the metal strip is tensioned is from about 0.5 MPa to about 50 MPa.

EC 28. The method of any of the preceding or subsequent example combinations, wherein a rotational speed of the magnetic rotor is about 100 rpm to about 5000 rpm.

EC 29. The method of any of the preceding or subsequent example combinations, wherein the rotational speed is about 1800 rpm.

EC 30. A system for performing the method of any of the preceding or subsequent example combinations, the system comprising the magnetic rotor, wherein the magnetic rotor is selectively rotatable in a forward direction and a reverse direction, and wherein the magnetic rotor is vertically adjustable such that the first distance is adjustable.

EC 31. A system for performing the method of any of the preceding or subsequent example combinations, the system comprising a magnetic tensioner comprising the magnetic rotor.

EC 32. The system of any of the preceding or subsequent example combinations, wherein the magnetic rotor is a top magnetic rotor of the magnetic tensioner, wherein the magnetic tensioner further comprises a bottom magnetic rotor vertically offset from the top magnetic rotor, wherein the bottom magnetic rotor and the top magnetic rotor are selectively rotatable in a forward direction or a reverse direction to induce a magnetic field into the metal strip such that the metal strip is tensioned, and wherein a gap configured to receive the metal strip is defined between the top magnetic rotor and the bottom magnetic rotor.

EC 33. The system of any of the preceding or subsequent example combinations, wherein the top magnetic rotor and the bottom magnetic rotor are a first set of magnetic rotors, and wherein the magnetic tensioner further comprises a plurality of sets of magnetic rotors.

EC 34. The system of any of the preceding or subsequent example combinations, wherein the top magnetic rotor and the bottom magnetic rotor are each vertically adjustable such that a size of the gap is adjustable.

EC 35. The system of any of the preceding or subsequent example combinations, further comprising: the unwind coiler; and the first work stand of the metal processing line.

EC 36. The system of any of the preceding or subsequent example combinations, further comprising: a first sensor downstream from the magnetic tensioner and configured to detect a first unwind tension in the metal strip; a second sensor upstream from the magnetic tensioner and configured to detect a second unwind tension in the metal strip; and a controller configured to rotate the magnetic rotor such that a tension from the magnetic rotor reduces the second unwind tension while maintaining the first unwind tension.

EC 37. The system of any of the preceding or subsequent example combinations, wherein the first sensor is configured to detect the first unwind tension at a roll gap of the first work stand, and wherein the second sensor is configured to detect the second unwind tension between the unwind coiler and the magnetic tensioner.

EC 38. The system of any of the preceding or subsequent example combinations, wherein the controller is configured to adjust at least one of a rotational speed of the magnetic rotor or the first distance to modulate the tension from the magnetic rotor.

EC 39. The system of any of the preceding or subsequent example combinations, further comprising: a first sensor downstream from the magnetic tensioner and configured to detect a first unwind tension in the metal strip; a second sensor at the magnetic tensioner and configured to detect an applied magnetic tension from the magnetic tensioner in the metal strip; and a controller configured to rotate the magnetic rotor to apply the tension from the magnetic rotor to control the first unwind tension.

EC 40. A system for performing the method of any of the preceding or subsequent example combinations, the system comprising a magnetic tensioner comprising the magnetic rotor.

EC 41. The system of any of the preceding or subsequent example combinations, wherein the magnetic rotor is a top magnetic rotor of the magnetic tensioner, wherein the magnetic tensioner further comprises a bottom magnetic rotor vertically offset from the top magnetic rotor, wherein the bottom magnetic rotor and the top magnetic rotor are selectively rotatable in a forward direction or a reverse direction to induce a magnetic field into the metal strip such that the metal strip is tensioned, and wherein a gap configured to receive the metal strip is defined between the top magnetic rotor and the bottom magnetic rotor.

EC 42. The system of any of the preceding or subsequent example combinations, wherein the top magnetic rotor and the bottom magnetic rotor are horizontally offset.

EC 43. The system of any of the preceding or subsequent example combinations, wherein the top magnetic rotor and the bottom magnetic rotor are a first set of magnetic rotors, and wherein the magnetic tensioner further comprises a plurality of sets of magnetic rotors.

EC 44. The system of any of the preceding or subsequent example combinations, wherein the top magnetic rotor and the bottom magnetic rotor are each vertically adjustable such that a size of the gap is adjustable.

EC 45. The system of any of the preceding or subsequent example combinations, further comprising: the rewind coiler; and the last work stand of the metal processing line.

EC 46. The system of any of the preceding or subsequent example combinations, further comprising: a first sensor downstream from the magnetic tensioner and configured to detect a first rewind tension in the metal strip; a second sensor upstream from the magnetic tensioner and configured to detect a second rewind tension in the metal strip; and a controller configured to rotate the magnetic rotor such that a tension from the magnetic rotor reduces the second rewind tension while maintaining the first rewind tension.

EC 47. The system of any of the preceding or subsequent example combinations, wherein the first sensor is configured to detect the first rewind tension at a roll gap of a first work stand, and wherein the second sensor is configured to detect the second rewind tension between an unwind coiler and the magnetic tensioner.

EC 48. The system of any of the preceding or subsequent example combinations, wherein the controller is configured to adjust at least one of a rotational speed of the magnetic rotor or the first distance to modulate the tension from the magnetic rotor.

EC 49. The system of any of the preceding or subsequent example combinations, further comprising: a first sensor downstream from the magnetic tensioner and configured to detect a first unwind tension in the metal strip; a second sensor at the magnetic tensioner and configured to detect an applied magnetic tension from the magnetic tensioner in the metal strip; and a controller configured to rotate the magnetic rotor to apply the tension from the magnetic rotor to control the first unwind tension.

EC 50. The system of any of the preceding or subsequent example combinations, wherein the controller is configured to adjust at least one of a rotational speed of the magnetic rotor or the first distance to modulate the tension from the magnetic rotor.

EC 51. A method of processing a metal strip comprising: passing the metal strip adjacent a magnetic rotor, wherein the magnetic rotor is spaced apart from the metal strip by a first distance; and rotating the magnetic rotor to induce a magnetic field into the metal strip such that a force normal to a surface of the metal strip is applied to the metal strip.

EC 52. The method of any of the preceding or subsequent example combinations, wherein passing the metal strip adjacent the magnetic rotor comprises supporting a coil of the metal strip on an unwind coiler and positioning a hold down roll comprising the magnetic rotor adjacent an unroll point of the metal strip from the coil.

EC 53. The method of any of the preceding or subsequent example combinations, further comprising adjusting the force applied to the metal strip by adjusting at least one of a rotational speed of the magnetic rotor or the first distance.

EC 54. A system for performing the method of any of the preceding or subsequent example combinations, the system comprising a hold down roll comprising the magnetic rotor, wherein the magnetic rotor is selectively rotatable in a forward direction and a reverse direction, and wherein the magnetic rotor is vertically adjustable such that the first distance is adjustable.

EC 55. The system of any of the preceding or subsequent example combinations, further comprising: an unwind coiler configured to support a coil of the metal strip; and a work stand of a metal processing line downstream from the unwind coiler.

EC 56. The system of any of the preceding or subsequent example combinations, wherein the metal processing line is a rolling mill.

EC 57. The system of any of the preceding or subsequent example combinations, further comprising: a first sensor upstream from the magnetic tensioner and configured to detect a first unwind tension in the metal strip; a second sensor at the magnetic tensioner and configured to detect an applied magnetic tension from the magnetic tensioner in the metal strip; and a controller configured to rotate the magnetic rotor to apply the tension from the magnetic rotor to control the first unwind tension.

EC 58. The system of any of the preceding or subsequent example combinations, wherein the controller is configured to adjust at least one of a rotational speed of the magnetic rotor or the first distance to modulate the tension from the magnetic rotor.

EC 59. A method of processing a metal strip comprising: passing the metal strip adjacent a magnetic rotor while passing the metal strip from a coil of the metal strip supported on an unwind coiler to a first work stand of a metal processing line downstream from the unwind coiler, wherein the magnetic rotor is spaced apart from the metal strip by a first distance; and rotating the magnetic rotor to induce a magnetic field into the metal strip such that the metal strip is tensioned in an upstream direction or a downstream direction between the unwind coiler and the first work stand.

EC 60. The method of any of the preceding or subsequent example combinations, wherein the magnetic rotor is a top magnetic rotor of a set of magnetic rotors comprising the top magnetic rotor and a bottom magnetic rotor vertically offset from the top magnetic rotor by a gap, wherein passing the metal strip adjacent the magnetic rotor comprises passing the metal strip through the gap, and wherein tensioning the metal strip comprises rotating the top magnetic rotor and the bottom magnetic rotor to induce the magnetic field into the metal strip such that the metal strip is tensioned.

EC 61. The method of any of the preceding or subsequent example combinations, wherein the top magnetic rotor and the bottom magnetic rotor are horizontally offset.

EC 62. The method of any of the preceding or subsequent example combinations, further comprising guiding a leading edge of the metal strip to a roll gap of the first work stand by tensioning the metal strip in the downstream direction.

EC 63. The method of any of the preceding or subsequent example combinations, wherein guiding the leading edge of the metal strip comprises centering the leading edge of the metal strip within the roll gap.

EC 64. The method of any of the preceding or subsequent example combinations, further comprising guiding a trailing edge of the metal strip to a roll gap of the first work stand by tensioning the metal strip in the upstream direction after the trailing edge has been unwrapped from the unwind coiler.

EC 65. The method of any of the preceding or subsequent example combinations, wherein guiding the trailing edge of the metal strip comprises centering the trailing edge of the metal strip within the roll gap.

EC 66. The method of any of the preceding or subsequent example combinations, wherein the metal strip comprises aluminum or an aluminum alloy.

EC 67. A method of processing a metal strip comprising: passing the metal strip adjacent a magnetic rotor, wherein the magnetic rotor is spaced apart from the metal strip by a first distance; detecting a first unwind tension in the metal strip downstream from the magnetic rotor; detecting a second unwind tension in the metal strip upstream from the magnetic rotor; and rotating the magnetic rotor to induce a magnetic field into the metal strip such that the metal strip is tensioned in an upstream direction or a downstream direction and a tension from the magnetic rotor reduces the second unwind tension while maintaining the first unwind tension.

EC 68. The method of any of the preceding or subsequent example combinations, wherein the first unwind tension is detected at a roll gap of a first work stand and the second unwind tension is detected at an unroll point of the metal strip from an unwind coiler.

EC 69. The method of any of the preceding or subsequent example combinations, further comprising: determining a tension at the unwind coiler; determining the tension added by the magnetic rotor; and calculating the tension at an entry of the work stand by summing the tension at the unwind coiler and the tension added by the magnetic rotor.

EC 70. The method of any of the preceding or subsequent example combinations, further comprising modulating the tension from the magnetic rotor by vertically adjusting the magnetic rotor relative to the metal strip to adjust the first distance, adjusting a rotational speed of the magnetic rotor, or adjusting a direction of rotation of the magnetic rotor.

EC 71. A method of processing a metal strip comprising: passing the metal strip adjacent a magnetic rotor while passing the metal strip from a last work stand of a metal processing line to a rewind coiler downstream from the last work stand, wherein the magnetic rotor is spaced apart from the metal strip by a first distance; and rotating the magnetic rotor to induce a magnetic field into the metal strip such that the metal strip is tensioned in an upstream direction or a downstream direction between the last work stand and the rewind coiler.

EC 72. The method of any of the preceding or subsequent example combinations, wherein the magnetic rotor is a top magnetic rotor of a set of magnetic rotors comprising the top magnetic rotor and a bottom magnetic rotor vertically offset from the top magnetic rotor by a gap, wherein passing the metal strip adjacent the magnetic rotor comprises passing the metal strip through the gap, and wherein tensioning the metal strip comprises rotating the top magnetic rotor and the bottom magnetic rotor to induce the magnetic field into the metal strip such that the metal strip is tensioned.

EC 73. The method of any of the preceding or subsequent example combinations, wherein the top magnetic rotor and the bottom magnetic rotor are horizontally offset.

EC 74. The method of any of the preceding or subsequent example combinations, further comprising guiding a leading edge of the metal strip to the rewind coiler by tensioning the metal strip in the downstream direction.

EC 75. The method of any of the preceding or subsequent example combinations, further comprising guiding a trailing edge of the metal strip to the rewind coiler by tensioning the metal strip in the upstream direction after the trailing edge has exited a roll gap of the last work stand.

EC 76. The method of any of the preceding or subsequent example combinations, further comprising: detecting a first rewind tension in the metal strip downstream from the magnetic rotor; detecting a second rewind tension in the metal strip upstream from the magnetic rotor; and tensioning the metal strip through the magnetic rotor such that a tension from the magnetic rotor reduces the second rewind tension while maintaining the first rewind tension.

EC 77. The method of any of the preceding or subsequent example combinations, further comprising: determining a tension at the rewind coiler; determining the tension added by the magnetic rotor; and calculating the tension at an entry of the work stand by summing the tension at the rewind coiler and the tension added by the magnetic rotor.

EC 78. The method of any of the preceding or subsequent example combinations, further comprising modulating tension from the magnetic rotor by vertically adjusting the magnetic rotor relative to the metal strip to adjust the first distance, adjusting a rotational speed of the magnetic rotor, or adjusting a direction of rotation of the magnetic rotor.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method of processing a metal strip comprising:
    passing the metal strip adjacent a magnetic rotor, wherein the magnetic rotor is spaced apart from the metal strip by a first distance;
    detecting a first unwind tension in the metal strip downstream from the magnetic rotor;
    detecting a second unwind tension in the metal strip upstream from the magnetic rotor; and
    rotating the magnetic rotor to induce a magnetic field into the metal strip such that the metal strip is tensioned in an upstream direction or a downstream direction and a tension from the magnetic rotor reduces the second unwind tension while maintaining the first unwind tension,
    wherein the first unwind tension is detected at a roll gap of a first work stand and the second unwind tension is detected at an unroll point of the metal strip from an unwind coiler
    wherein the method further comprises:
    determining a tension at the unwind coiler; and
        determining the tension added by the magnetic rotor,
        wherein detecting the first unwind tension comprises calculating the tension at an entry of the work stand by summing the tension at the unwind coiler and the tension added by the magnetic rotor.

2. The method of claim 1, further comprising modulating the tension from the magnetic rotor by vertically adjusting the magnetic rotor relative to the metal strip to adjust the first distance, adjusting a rotational speed of the magnetic rotor, or adjusting a direction of rotation of the magnetic rotor.

* * * * *